(12) United States Patent
Li et al.

(10) Patent No.: US 6,916,428 B2
(45) Date of Patent: Jul. 12, 2005

(54) PHOTO-CHEMICAL REMEDIATION OF CU-CMP WASTE

(75) Inventors: Yuzhuo Li, Norwood, NY (US); Jason Keleher, Potsdam, NY (US); Ning Gao, Norwood, NY (US)

(73) Assignees: Amia Corporation, Taoyuan Hsien (TW); Persee Chemical Co., Ltd., Tucherng (TW)

( * ) Notice: Subject to any disclaimer, the term of this patent is extended or adjusted under 35 U.S.C. 154(b) by 81 days.

(21) Appl. No.: 10/678,415

(22) Filed: Oct. 3, 2003

(65) Prior Publication Data

US 2005/0072742 A1 Apr. 7, 2005

(51) Int. Cl.⁷ .................................................. C02F 1/30
(52) U.S. Cl. ........................ 210/748; 210/763; 210/768; 210/912; 156/345.13
(58) Field of Search ................................ 210/748, 757, 210/758, 763, 768, 912; 156/345.12, 345.13; 438/693

(56) References Cited

U.S. PATENT DOCUMENTS

| | | | | |
|---|---|---|---|---|
| 5,501,801 A | * | 3/1996 | Zhang et al. | 210/748 |
| 6,183,351 B1 | * | 2/2001 | Aoki | 451/60 |
| 6,238,571 B1 | * | 5/2001 | Olmez et al. | 210/722 |
| 6,398,964 B1 | * | 6/2002 | Brady et al. | 210/638 |
| 6,464,951 B1 | * | 10/2002 | Kittrell et al. | 423/240 R |
| 6,585,863 B2 | * | 7/2003 | Davydov et al. | 204/157.3 |
| 2001/0052500 A1 | * | 12/2001 | Sun et al. | 210/729 |
| 2004/0065621 A1 | * | 4/2004 | Sha et al. | 210/713 |

FOREIGN PATENT DOCUMENTS

JP 2002-263990 A * 9/2002

* cited by examiner

Primary Examiner—Frank M. Lawrence
(74) Attorney, Agent, or Firm—Alan D. Kamrath; Nikolai & Mersereau, P.A.

(57) ABSTRACT

A photo-chemical remediation of Cu-CMP waste streams basically includes the following acts: adding photo-catalyst particles into waste streams containing copper ions and organic pollutants and exposing the waste streams to UV light or sunlight to make copper ions become deposited on surfaces of the photo-catalyst particles. Whereby, the copper ions are removed from the waste streams. Meanwhile, organic and inorganic pollutants are decomposed by the photolysis capability of the photo-catalyst to make the waste streams dischargable within environmental standards to the environment.

8 Claims, 2 Drawing Sheets

PHOTO-CHEMICAL REMEDIATION OF CU-CMP WASTE

BACKGROUND OF THE INVENTION

1. Field of the Invention

The present invention relates to a photo-chemical remediation of Cu-CMP (Chemical Mechanical Polishing) waste streams, and more particularly to a remediation process that adds a photo-catalyst to waste streams in CMP processes to deposit copper ions, decompose organic pollutants via UV radiation and ultimately produce a clean waste stream.

2. Description of Related Art

Chemical Mechanical Polishing (CMP) has become the key planarization technology for the fabrication of ultra large-scale integration (ULSI) silicon devices that contain sub-quarter micron metal and dielectric lines.

In conventional CMP processes, aluminum is used as interconnecting material. Before the introduction of copper as the interconnecting material to replace aluminum, the CMP waste treatment was not a major issue. Silica and fluoride contaminants in the CMP system using aluminum are diluted with water from other facility processes and commonly routed to an acid waste neutralization system. After replacing the aluminum in the CMP system with copper, many new challenges are experienced in the treatment of post process waste streams. The Cu-CMP process is a major consumer of resources (slurry) and most of all is a producer of solid waste (pad) and waste containing effluent (spent slurry).

Common Cu-CMP process effluent contains a variety of organic and inorganic contaminants that originated from the slurry, and tool discharged and post-CMP cleaning processes. The fate and transportation of these pollutants depend on several factors, which include pH and redox-chemistry of the treatment system.

Organic materials commonly found in the CMP effluent include metal complexing agents, surfactants, stabilizers, and corrosion inhibiting agents whose solubility is highly dependent on the pH of the slurry. One example is the aromatic amine, benzotriazole (BTA) that is used as a corrosion inhibitor and copper removal control agent. BTA forms a water-soluble complex with copper being an acid salt at a low pH condition. As the pH is increased toward the alkaline regime, the soluble complex become insoluble and thus may increase the strain on the post process treatment. Dispersing agents, such as polyacrylic acid, remain water-soluble over a large pH range and thus the adjustment of the pH may not be an effective mechanism of waste removal. The coagulation of solids in the system may be an effective mechanism of removal but the addition of organic additives to the slurry may result in a system difficult to flocculate in post process treatment.

Inorganic materials commonly present in post-process effluent are insoluble materials from the slurry abrasive (ceria, alumina, silica) and have a concentration range of 50–500 ppm. The abrasive particles tend to be well suspended in the large volume of water present and are commonly in the oxidized forms. The presence of soluble inorganic materials is commonly a result of the oxidizer of choice such as hydroxylamine and hydrogen peroxide.

The major inorganic contaminants are the materials that are removed from the surface of the wafer, such as metals, metal oxides, and low coefficient dielectric materials. During the Cu-CMP process, approximately micron of Cu metal is removed from the surface of the wafer, which translates into about 0.28 g of Cu per metal layer for a 200 mm diameter wafer process. Along with the abraded materials are some inorganic and organic materials that must also be treated. Common processes will provide a means to treat each class of components separately in a multi-step treatment system. Therefore, conventional treatment system of Cu-CMP waste streams is complex and has multiple factors such as pH condition and redox-chemistry etc. which influence the efficiency of the treatment system.

The present invention has arisen to provide a remediation for Cu-CMP waste streams to overcome and obviate the drawbacks of the conventional treatment system.

SUMMARY OF THE INVENTION

A first objective of the present invention is to provide a photo-chemical remediation of Cu-CMP waste streams that is added with photo-catalytic particles in the waste treatment and is exposed with UV radiation to deposit copper ions on surfaces of the photo-catalytic particles and to decompose organic pollutants.

A second objective of the present invention is to provide photo-chemical remediation of Cu-CMP waste streams that generates usable conductive particles coated with copper to recycle copper for sale and to counteract the operational cost.

Further benefits and advantages of the present invention will become apparent after a careful reading of the detailed description in accordance with the drawings.

DETAILED DESCRIPTION OF THE PREFERRED EMBODIMENT

Figure 1:
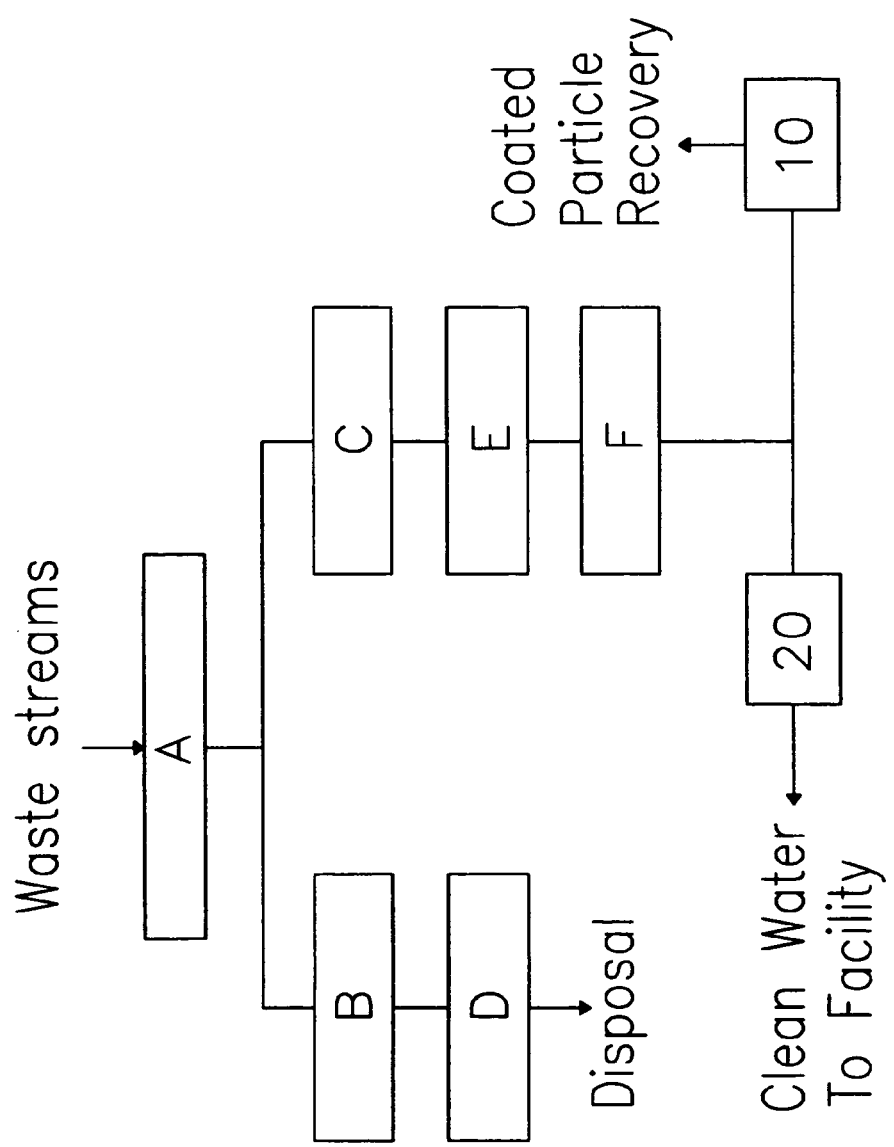
FIG. 1 is a schematic operational block diagram of a photo-chemical remediation of Cu-CMP waste streams in accordance with the present invention.

A photo-chemical remediation of Cu-CMP waste streams in accordance with the present invention comprises the following acts:
  adding photo-catalyst particles into waste streams containing copper ions and organic pollutants; and
  exposing the waste streams to UV light or sunlight to make copper ions become deposited on surfaces of the photo-catalyst particles and to decompose the organic pollutants;
  whereby, copper ions are removed from the waste streams and the organic pollutants are eliminated from the waste stream to enable reuse of water into other equipment. Additionally, the photo-catalyst particles coated with copper are usable for micro-electronic products to compensate operational cost. With reference to FIG. 1, the photo-chemical remediation of Cu-CMP waste streams is particularly illustrated in the following description.

Waste streams containing effluent are received from the facility and then enter a pre-treatment chamber (A). In the pre-treatment chamber (A), an amount of photo-catalyst in the form of particles is added and the solid particulate is separated from the water containing dissolved contaminants. Wherein the photo-catalyst can be selected from the group comprising: $ZnO$, $ZnS$, $BaTiO_3$, $ZnTiO_3$, $FeTiO_3$, $Fe_2O_3$, $TiO_2$, and any metal oxides that have a similar band gap and band positions to $TiO_2$. Take $TiO_2$ for example, the photo-chemical nature of $TiO_2$ has been utilized for photo-reduction and photo-oxidation for various organic compounds, such as in the area of organic molecule transformation for environmental and synthetic applications. $TiO_2$ is also utilized for photo-reduction of metal (Ag, Au, Cu, Bi, Pd, Pt) that has application ranging from environmental waste treatment to solar energy conversion. The success of $TiO_2$ is rated in accordance with its ability to produce the multi-functional oxidation and reduction sites and to allow for high performance reactions and degradation processes.

Figure 2:
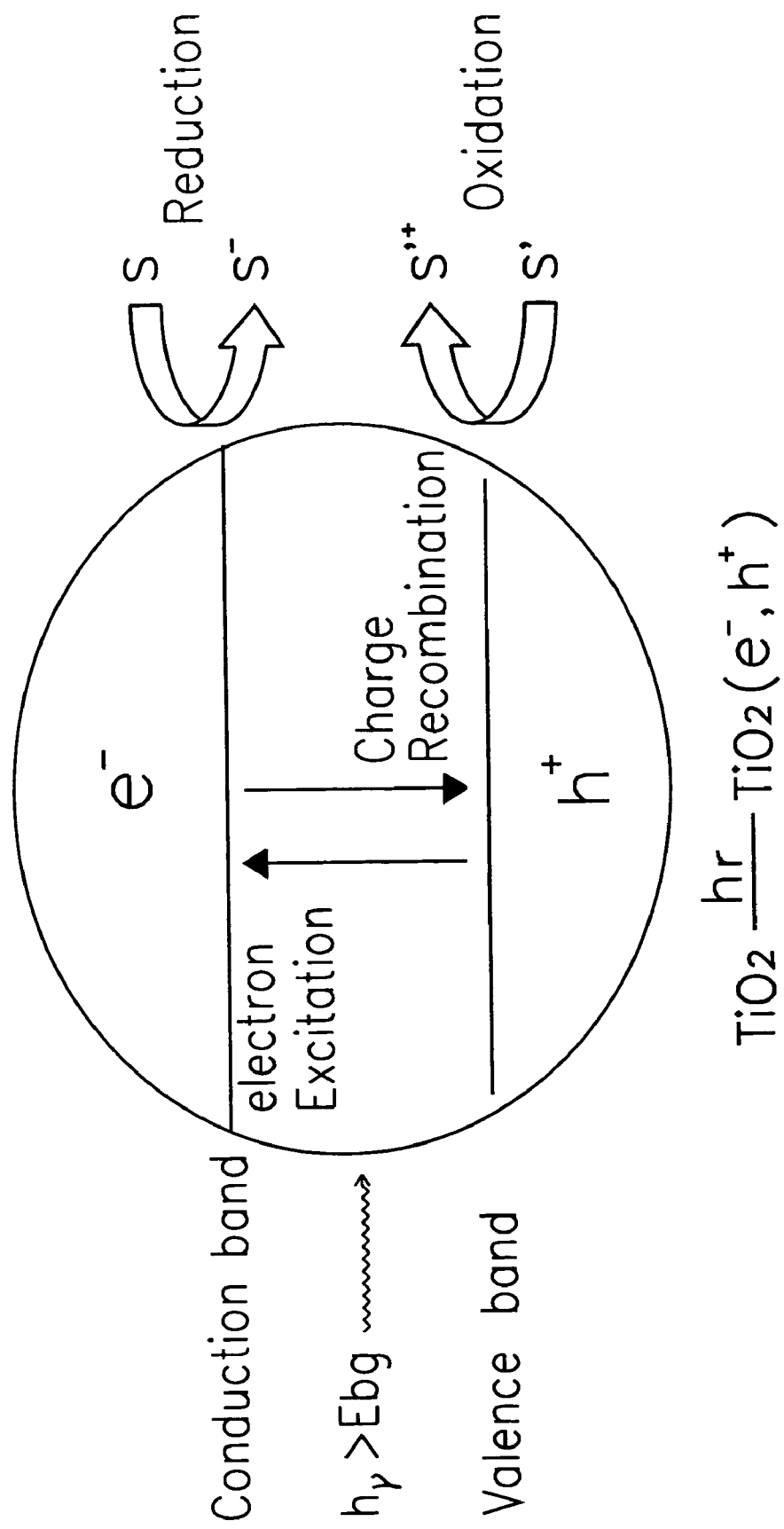
FIG. 2 is a schematic representation figure of band gap photo-excitation properties of $TiO_2$ particles.

The theory of the photo-chemistry is illustrated as following: a semiconductor particle is commonly characterized by the energy gap between an electronically populated valance band and a largely vacant conduction band. The energy gap determines the wavelength of light that is required to cause excitation in the semiconductor. FIG. 2 shows an example of the common band structure of a semiconductor particle. When the $TiO_2$ is exposed under UV light having a wavelength less than 400 nm, electrons are excited by the energy of UV light and jump to the conductive band. Excitation of the electron results in the formation of an electron—electron hole pair at the surface of the particle to form two reactive sites (electron and electron-holes). The electron hole lacks an electron and has oxidation capability to capture an electron for an electric charge balance. The electron existing alone has reduction capability. Therefore, the $TiO_2$ enables the oxidative and reductive reactions to proceed at the same time.

Semiconductor particles used for the photo-catalyst are categorized in three types based on the particles' ability to spilt $H_2O$. The first type is an oxidative type (O-type) semiconductor, such as $WO_3$ or $Fe_2O_3$, wherein the oxidative power is strong enough to oxidize water but will not reduce water. The second type is the reductive type (R-type) semiconductor, such as SiC or CdSe, wherein the reductive reduces but does not oxidize the water. Finally, the third type is an oxidative-reductive type (OR-type) semiconductor, such as $TiO_2$, ZnO, ZnS, $BaTiO_3$, $BaTiO_3$, $ZnTiO_3$, $FeTiO_3$, $Fe_2O_3$ or any metal oxide that has a similar band gap and band position to $TiO_2$, which have the power to both oxidize and reduce $H_2O$ if change recombination can be controlled. Take $TiO_2$ for example again, the oxidative and reductive capabilities of the $TiO_2$ enable organic pollutants and metal ions in the waste streams to be oxidized and reduced to satisfy demands in the present invention.

The separated solid particulate containing a small amount of photo-catalyst is sent to a reaction chamber (B). In the reaction chamber (B), the separated solid particulate is exposed to direct UV radiation to assure decomposition of any $H_2O_2$ (which had been used as oxidant in the CMP processes) or organic pollutants that have been loosely absorbed on the surface of the solid particulate. The exposed solid particulate is sent to a drying chamber (D) for further removal of water and other trace amounts of organic pollutants. Lastly, the solid particulate is removed and sent off for proper disposal.

Exposing time under UV sunlight in the reaction chamber (B) depends on the types of the metal ions and composition of the organic additives in the CMP process or the energy strength of light source. Take sunlight for example, the exposure time is about 30–300 minutes.

Waste water containing the dissolved contaminants and metal ions is sent to an oxidation chamber (C) in which oxidation occurs. In the oxidation chamber (C), remediation chemistry for both the oxidation of the organic pollutants and the reduction of the metal ions is added. The remediation chemistry means a catalyst causes oxidation to organic pollutants and reduction to metal ions. The remediation chemistry includes but does not limit to photo-catalysts using semiconductor particles alone or in combination with other conventional or novel approaches including ozone, hydrogen peroxide, and direct photo-catalysis. The waste water containing the remediation chemistry is irradiated via sunlight or direct UV light to allow the oxidation of the organic pollutants to become inert and the decomposition of the $H_2O_2$ to occur. Inert organic pollutants in the presence of the metal ions left in the waste water is sent to a reduction chamber (E). In the reduction chamber (E), the focus switches to a reduction process that assists in the deposition of the metal ions, namely Cu, onto the surface of the photo-catalyst particles by exposing again to either direct UV or sunlight irradiation for a period of time. Upon completion of the reaction, the waste water with metal-coated particles is sent to a separation chamber (F) after exposure.

In the separation, the metal-coated particles (10) are separated from water. The remediated water (20) is sent back to the facility stream, which meets both Environmental Protection Agency (EPA) and semiconductor standards.

$TiO_2$ serving as a photo-catalyst is selectively used alone or in combination with advanced oxidization processes (AOP) such as by adding ozone, hydrogen peroxide, or by bio-process or conventional waste treatment schemes. In the oxidation process, small amounts of a photo-catalyst selectively added to either the pre-polish slurry or the post-polish effluent to activate photolysis to the organic pollutants including surfactants, chelating agents, debris from low-k dielectric materials and other oxidizing agents. The oxidation process takes advantage of the existing oxidizing agents (i.e. $H_2O_2$ and persulfate) in the effluent and destroys them at the same time.

In the separation process, abrasive particles (ceria silica and alumina) are separated from the waste stream so that the waste streams are free of metals and organic pollutants. Thereby, the waste streams are enabled to be deposed in landfills and expensive abrasive particles such as diamond and ceria can be recovered.

In the reductive process, the metal ions are converted into metallic form. Special chemical conditions are controlled so that Ta and Cu will be deposited on the surface of the photo-catalyst and selectively separated from other metals. The metal-coated particles are recovered and used for other various microelectronic applications. The reductive process provides a possible means to help offset the process cost of operation.

The special chemical conditions use specialty complexing agents to separate Ta from Cu. There are several feasible approaches to accomplish the separation of Ta, however only two examples are described here.

A first method is to utilize the redox potential difference between Ta and Cu. When an appropriate complexing agent is used such as glycine or citric acid, the copper ions are reduced before the Ta ions and are deposited on to the surface of $TiO_2$ particles first. The Ta ions dissolved in the waste water are scavenged by using an absorbent such as ion exchange resin. After absorbing the Ta-ions by the ion exchange resin, an acidic solution is used to release the Ta ions from the ion exchange resin to concentrate and purify the Ta-ions for recycling.

A second method is to extract Ta after both Ta and Cu ions are deposited on the surface of the $TiO_2$ particles. A solution containing a specialty complexing agent is used to extract Ta or Cu from the surface. For Cu ion extraction, the specialty complexing agent is preferred to be glycine or similar amino acids. For Ta ion extraction, the specialty complexing agent is preferred to be 1,2-diols, rsorcinols, 1,3-diols, 1,3-diamines, bipyridyls and other compounds bonding imido bond with Ta ions. After extracting one metal, the remaining metals can be released from the $TiO_2$ surface easily via a nitric acid treatment in which 1N nitric acid is used to wash the coated $TiO_2$ particles.

The advantage of the first method is that the copper coated TiO2 particles are directly reused as conducting material, but the disadvantage of the first method is that the ion exchange resin introduces extra treatment steps. The advantage of the second method is that the copper is recovered as a solution, but the specialty complexing agent for recovering Ta is expensive and thus operational costs are increased.

After these three processes, the Copper ions ($Cu^{+2}$) are reduced to metallic forms and deposed on the surface of $TiO_2$ particles and the organic pollutant is oxidized and degraded. The treated water stream contains Cu ions of 50 ppb and no organic pollutant over 20 ppm, with single organic pollutant as low as below 0.4 ppm, both which meet the waste discharge standards. Therefore, the photo-catalyst remediation in the present invention is suitable for treating waste streams containing metal ions in high concentration.

One of the most important features of the present invention is the metal recovery and reuse. The copper ions are deposited onto $TiO_2$ particles to form conductive particles that can be used in lead areas of a high performance capacitor. Conventionally, the lead areas are made of silver/Pd alloys. The disadvantages of the alloy include the mismatch of thermal expansion coefficients. The use of $TiO_2$ coated conductive material can solve such problems. Additionally, the Ta ions can be reused to resolve an anticipated shortage of Ta when the copper technology becomes mainstream. A key experiment is the separation of Ta and Cu during deposition. The separation is accomplished through the use of a selective chelating agent. When a proper chelating agent is used, Cu or Ta is enabled to be selectively reduced. In order to reuse Ta, the metal must be desorbed from the particles, then concentrated and purified. The added chelating agents have to be destroyed via another oxidative process before the water is discharged.

According to the above description, the photo-chemical remediation for Cu-CMP waste streams simply adds a photo-catalyst into the waste streams and exposes the waste streams to UV light to remove the copper ions and the organic pollutants at the same time. Therefore, the treating processes of the Cu-CMP waste streams are simplified and easily controlled.

Although the invention has been explained in relation to its preferred embodiment, many other possible modifications and variations can be made without departing from the spirit and scope of the invention as hereinafter claimed.

What is claimed is:

1. A photo-chemical remediation of Cu-CMP waste streams containing copper ions and organic pollutants, comprising following acts:

adding photo-catalyst in solid forms of particles into the waste streams; and exposing the waste streams to light to deposit copper ions on a surface of the photo-catalyst particles and to decompose the organic pollutants.

2. The remediation as claimed in claim 1, wherein the photo-catalyst is oxidative-reductive typed.

3. The remediation as claimed in claim 2, wherein the photo-catalyst is selected at least one from the group comprising: $TiO_2$, ZnO, ZnS, $BaTiO_3$, $BaTiO_3$, $ZnTiO_3$, $FeTiO_3$ and $Fe_2O_3$.

4. The remediation as claimed in claim 1, wherein the light is UV light and has an exposure time within 10–100 minutes.

5. The remediation as claimed in claim 1, wherein the light is sunlight and has an exposure time within 30–300 minutes.

6. The remediation as claimed in claim 1, wherein the remediation further comprises following acts before exposure when the waste streams contain solid particulate:

separating the solid particulate from the waste streams, wherein the solid particulate mingles with a small amount of the photo-catalyst; and exposing the solid particulate to light.

7. The remediation as claimed in claim 6, wherein the waste streams separated from the solid particulate in the separating act further are added with remediation chemistry and exposed to light;

whereby the organic pollutants are oxidized and rendered inert.

8. The remediation as claimed in claim 7, wherein the waste streams are exposed with light again to reduce and deposit the copper ions on the photo-catalyst.

* * * * *